(12) United States Patent
Bauers et al.

(10) Patent No.: US 11,560,241 B2
(45) Date of Patent: Jan. 24, 2023

(54) SUPPORT BRACKET FOR HOLDING INTERIOR COMPONENTS OF A VEHICLE

(71) Applicant: Airbus Operations GmbH, Hamburg (DE)

(72) Inventors: Michael Bauers, Hamburg (DE); Nufel Erdogan, Hamburg (DE); Thomas Kahl, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 512 days.

(21) Appl. No.: 16/555,707

(22) Filed: Aug. 29, 2019

(65) Prior Publication Data

US 2020/0079525 A1   Mar. 12, 2020

(30) Foreign Application Priority Data

Sep. 7, 2018  (DE) .......................... 102018121842.7

(51) Int. Cl.
*B64D 47/00* (2006.01)

(52) U.S. Cl.
CPC .................................. *B64D 47/00* (2013.01)

(58) Field of Classification Search
CPC ......... B64D 47/00; B64D 11/00; F21V 17/10; F21V 17/16; F21V 17/164; F21W 2106/00; F16B 21/09; F16B 2/20; F16B 5/06; F16B 5/12; B64C 1/066; B64C 1/403

See application file for complete search history.

(56) References Cited

U.S. PATENT DOCUMENTS

| | | | |
|---|---|---|---|
| 5,871,318 A | 2/1999 | Dixon et al. | |
| 7,007,906 B2* | 3/2006 | Slatter | A01K 91/08 114/255 |
| 7,527,223 B2* | 5/2009 | Ebner | B64C 1/066 24/458 |
| 8,371,550 B2 | 2/2013 | Horst et al. | |
| 9,254,908 B2* | 2/2016 | Healy | H02G 3/32 |
| 9,562,626 B2* | 2/2017 | Gustin | F16L 3/127 |
| 11,079,064 B1* | 8/2021 | Cifers | F16M 11/2092 |
| 2003/0209632 A1 | 11/2003 | Hessling | |
| 2007/0252041 A1* | 11/2007 | Ebner | B64C 1/066 244/131 |
| 2011/0024560 A1 | 2/2011 | Horst et al. | |
| 2013/0104494 A1* | 5/2013 | Evangelista | H02G 3/125 52/741.1 |
| 2016/0245428 A1* | 8/2016 | Gustin | F16L 3/02 |
| 2016/0288151 A1* | 10/2016 | Schultz | F16M 11/105 |

FOREIGN PATENT DOCUMENTS

| | | |
|---|---|---|
| CN | 110884641 A | 3/2020 |
| DE | 10 2009 034 997 A1 | 2/2011 |
| EP | 2 562 432 A1 | 2/2013 |
| EP | 3 620 370 A1 | 3/2020 |
| GB | 2 436 971 A | 10/2007 |

OTHER PUBLICATIONS

German Search Report for Application No. 10 2018 121 842.7 dated Apr. 29, 2019.
European Search Report for Application No. 19194602.9 dated Jan. 16, 2020.

* cited by examiner

*Primary Examiner* — Benjamin P Lee
(74) *Attorney, Agent, or Firm* — Jenkins, Wilson, Taylor & Hunt, P.A.

(57) ABSTRACT

A support bracket for holding interior components of a vehicle includes a base plate and an add-on module, which are engageable with each other to facilitate replacement and maintenance.

19 Claims, 6 Drawing Sheets

SUPPORT BRACKET FOR HOLDING INTERIOR COMPONENTS OF A VEHICLE

CROSS-REFERENCE TO PRIORITY APPLICATION

This application claims the benefit of, and priority to, German patent application number DE 102018121842.7, filed Sep. 7, 2018. The content of the referenced application is incorporated by reference herein.

TECHNICAL FIELD

Embodiments of the subject matter described herein relate generally to a support bracket for holding interior components of a vehicle, as well as a vehicle, in particular an aircraft, having at least one such support bracket.

BACKGROUND

In passenger transport vehicles often numerous installations are provided for several purposes. These are often accompanied by supply or data cables or supply ducts, which may be fixed to an interior wall of the vehicle. While bulky and heavy installations are usually supported on structural components, such as frames, lightweight installations are often installed through brackets attached to the interior wall.

In case the vehicle comprises a vehicle body or a fuselage that is based on fiber reinforced plastics material, it is known to include brackets to the skin by bonding them directly to the material. However, brackets may be damaged during the operation of the vehicle due to vibration or acceleration induced loads and a replacement is required. The replacement of directly bonded brackets is time-consuming and requires the lot of effort. The brackets must be released from their installation position by destroying the bond and by reworking the surface. Afterwards, a new bracket has to be bonded to the skin again.

BRIEF SUMMARY

It is an object of the disclosure to propose an alternative support bracket for holding interior components of a vehicle that allows a simple replacement without requiring much effort and without requiring a considerable amount of time.

This object is met by a support bracket defined in independent claim one. Advantageous embodiments and further improvements may be gathered from the subclaims and the following description.

A support bracket for holding interior components of a vehicle is proposed, the bracket comprising a base plate and a separate add-on module, wherein the base plate comprises a flat attachment face for fixedly bonding the base plate to a vehicle structure, and a module face opposed thereto for receiving the add-on module, wherein the add-on module comprises an engagement face and an outer face opposed thereto, wherein the base plate comprises a first engagement device arranged on the module face and the add-on module comprises a second engagement device on the engagement face, wherein the first engagement device and the second engagement device are designed for conducting a form-fit engagement, and wherein the add-on component comprises a holding section for holding the interior component.

Hence, the support bracket according to the disclosure is a combination of two components. The base plate is a component that is to be fixed to the vehicle. For this, it comprises a flat attachment face for fixedly bonding the base plate to the vehicle structure. Fixedly bonding may include different methods, such as gluing or co-bonding to a structure that is made from a fiber reinforced plastics material. It is still intended to attach the base plate rigidly and substantially irreversibly.

The flat attachment face does not necessarily have to be completely planar or have to comprise a complete, continuous surface. However, it is feasible if the base plate has at least one contour that conforms the curvature or the respective surface of the vehicle structure, to which the base plate is to be bonded. The base plate may include a plurality of openings or cutouts that reduce the weight of the base plate.

The base plate also comprises a module face opposed to the attachment face. The module face is dedicated to receiving an add-on module. As explained further below, the engagement face and the module face of the base plate may belong to one of various different setups.

By providing the first engagement device and the second engagement device, which are engageable with each other, allows to divide the add-on module into two components, wherein one of them is replaceable. Particularly, the add-on module is intended for holding the respective installation. If the add-on module breaks, it may simply be removed from the base plate and be replaced by another add-on module. Since the support bracket according to the disclosure is primarily intended for very low loads the first engagement device and the second engagement device do not necessarily have to carry great loads. It may be feasible, however, to design the engagement devices to carry a load that is greater than a limit load to be introduced into the add-on module.

The holding section is designed for the holding function and may be capable of receiving fastening means. Also, more than one holding section may be provided on a single add-on module, if desired.

Altogether, the support bracket according to the disclosure provides a simple way to hold interior components of a vehicle, while allowing a simple replacement without requiring much effort and without requiring a considerable amount of time. Also, various different add-on modules may be provided to adapt the support bracket to different requirements, without having to modify the base plate.

In a preferred embodiment a support frame is arranged on the outer face of the base frame facing away from the second engagement device, and wherein the holding section is arranged on or at a distal end of the support frame. Hence, the add-on component is realized in the form of a frame that extends from a base frame of the add-on component to a holding section. The length and dimension of such a support frame is to be adapted to the component to be held by the support bracket. For achieving a low weight, the support frame may include several openings, cutouts, a clear distance between individual frame parts etc.

In a further advantageous embodiment, the support frame comprises two legs arranged at a distance to each other on and extending away from the base frame, and wherein the holding section is a bridge part that connects both legs at a side of the legs opposed to the base frame. Consequently, the support bracket may constitute a trapezoidal shape with the base frame, the legs and the bridge part. The holding section can be designed completely independent from the base frame, which allows the add-on module to be adapted to the particular load and installation situation. Particularly, the legs allow to define a certain distance between the base plate and the installation to be held. However, the weight of the add-on module is very low.

In an advantageous embodiment, one of the first engagement device and the second engagement device has an elongate recess, wherein the other one of the first engagement device and the second engagement device has an elongate projection that conforms the elongate recess, wherein the first engagement device and the second engagement device are designed to conduct a sliding motion parallel to the base plate from an insertion position to an end position to reach the form-fit engagement. The add-on module may thereby be inserted into the base plate by a sliding motion. Through a corresponding design of the engagement devices a very rigid and durable connection between the base frame and the add-on module can be achieved. It is not relevant, where the recess and the projection are provided, as long as they correspond to each other.

In a preferred embodiment, the first engagement device and the second engagement device latch into each other when the end position of the sliding means is reached. This may further improve the connection between the base plate and the add-on module, since the add-on module may remain in this end position. Vibrations and acceleration-induced loads do not lead to releasing the connection. Again, it is not relevant, where the required components for the latching are provided, as long as they correspond to each other and allow their fixation in the end position.

Advantageously, the first engagement device has a recess perpendicular to the base plate and corresponding to the second engagement device, wherein the second engagement device is designed to latch into the first engagement device when inserted into the recess and reaching an inner end of the recess. If the base plate is attached to a surface, the recess is arranged perpendicular to the surface. Consequently, the add-on module is inserted by moving it perpendicularly to the surface into the recess. The attachment, i.e. the engagement devices, completely differ from the above-mentioned sliding engagement devices.

In this embodiment, the first engagement device has at least one latching cut-out, which is arranged in or above the base plate, wherein the second engagement device has at least one latching clip, which is designed to latch into the corresponding latching cut-out to firmly hold the add-on module. The latching cut-out may in some cases comprise an undercut, into which a corresponding projection can be inserted. The projection may be arranged on the second engagement device and be provided in the shape of a latching clip. In a particularly advantageous embodiment, the latching clip may comprise a latching hook or projection. Altogether, the assembly is simple and the achievable holding force can be quite high. This, of course, depends on the detail design of the engagement devices.

The first engagement device may advantageously comprise a set of webs arranged perpendicularly on the module face and enclosing the recess. Hence, the recess comprises a guiding device in the form of the webs that guide a user and the second engagement device to reach the recess at a predetermined, exact position. The webs do not necessarily create a closed contour around the recess, but may also comprise slits, openings or cutouts.

Preferably, at least one of the base plate and the add-on component comprises a plastics material. Since of the brackets according to the disclosure are primarily intended for holding installations with a low weight or that lead to low mechanical loads, it is sufficient to manufacture them from a plastics material. A plurality of different materials may be applicable. For example, the base plate may comprise Polyetherimide. It may also be fiber-reinforced, e.g. by glass fibers or other suitable fibers. The add-on module may comprise Polyamide, which may also be fiber-reinforced. However, also Polyamide, PEKK, PEKK or PPS may be applicable for the base plate. The same applies to the add-on module, which may also be made from Polyetherimide or any other of the above mentioned materials.

In order to additionally secure the connection between the base plate and the add-on module, a securing pin may be used, which extends through both the base plate and the add-on module in the assembled/connected state. For this purpose, both may comprise at least one bore-hole, wherein the bore-holes are positioned directly and flushly adjacent in the assembled/connected state.

The disclosure further relates to a method for placing a support bracket of the above description to a vehicle structure for holding an interior component of a vehicle, the method comprising the steps of bonding the flat attachment face of the base plate to the vehicle structure in a material bonding manner, inserting the second engagement device of the add-on module into the first engagement device, and engaging the first engagement device and the second engagement device. The material bonding may be conducted by gluing, welding or co-bonding.

Advantageously, the bonding may comprise the irreversible bonding of the attachment face. Due to the rigid and sturdy bonding of the base plate it may be advantageous to also provide a rigid and sturdy first engagement device. This may lead to the add-on module being designed to be a weaker part, which would in turn protect the first engagement device from breaking if the add-on module is exposed to higher forces.

Still further, the engaging may comprise moving the second engagement device from an insertion position into an engagement position in the first engagement device. It may be preferred to let the first engagement device and the second engagement device latch.

The disclosure further relates to a vehicle, comprising a vehicle body having a structure, wherein at least one base plate of a bracket according to the above description is bonded to an interior side of the structure for receiving an add-on module each.

In this regard, the structure may comprise a skin. Hence, the at least one base plate is arranged on the skin. The resulting support brackets, which are created by placing an add-on module onto a respective base plate, may hold installations directly at the skin, while the distance to the inner surface of the skin is primarily determined by the length of the add-on module.

The structure may comprise a fiber reinforced plastics material having a matrix, into which reinforcement fibers are integrated, and wherein the base plate is integrated into the structure. The integration may be achieved by a co-bonding or welding, depending on the type of matrix material.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of the exemplary embodiments illustrated in the figures. In this respect, all described and/or graphically illustrated characteristics also form the object of the disclosure individually and in arbitrary combination regardless of their composition in the individual claims or their references to other claims. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
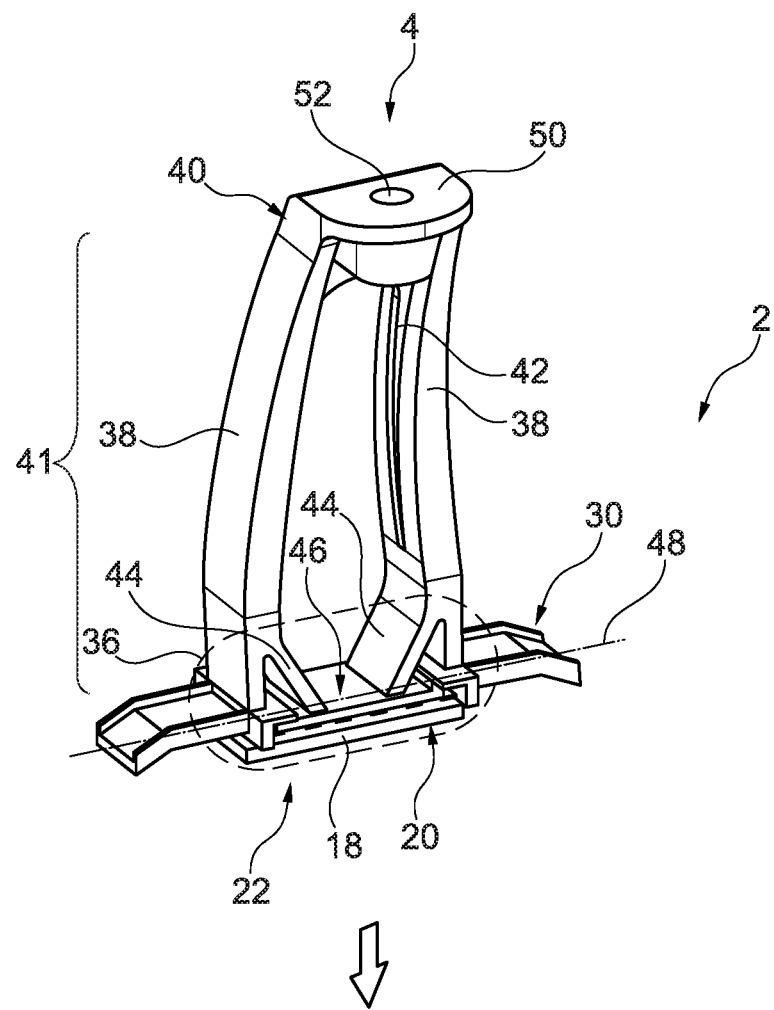
FIGS. 1, 2 and 3 show a first exemplary embodiment of the support bracket.
Figure 1:
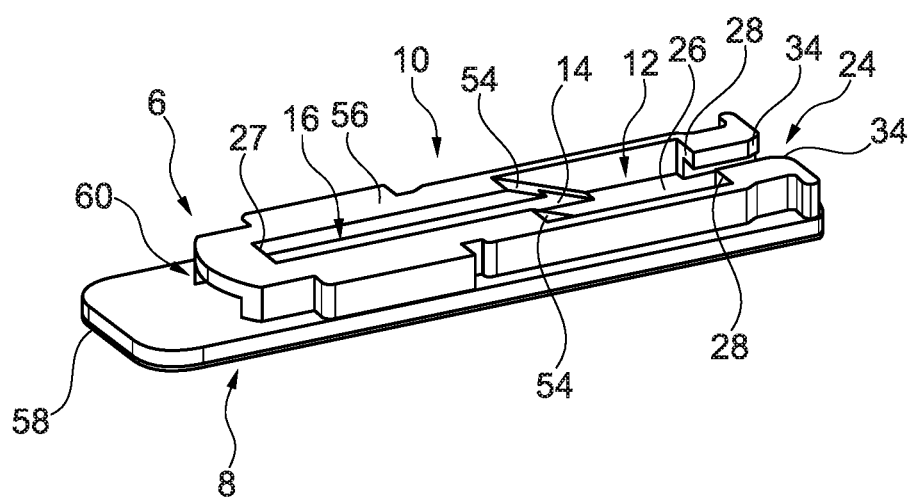

FIG. 1 shows a first exemplary embodiment in form of a support bracket 2. Here, an add-on module 4 and a base plate 6 are illustrated, which together form the support bracket 2. The base plate 6 comprises a flat attachment face 8, with which the base plate 6 is bonded to the vehicle. A module face 10 is positioned opposed thereto, which is intended for receiving the add-on module 4. For this purpose, the base plate 6 comprises a first engagement device 12, which comprises an elongate recess 14.

The recess 14 comprises two opposed undercuts 16, which allow to receive two opposed projections 18 arranged in a second engagement device 20 that is placed on an engagement face 22 of the add-on module 4. The recess 14 also comprises an insertion region 24, which is open to a lateral side of the base plate 6 to receive the second engagement device 20 by sliding it into the recess 14.

Additionally, a gap 26 is arranged between the insertion region 24 and an opposed end 27 of the recess 14. At an end of the gap 26 that is adjacent to the insertion region 24, two opposed mechanical stops 28 are provided. They face away from the insertion region 24 and instead are directed to the remaining part of the recess 14 at the other side of the gap 26, i.e. in the direction of the opposed end 27. After inserting the add-on component 4 into the recess 14 and sliding it along the recess 14 completely, a clip 30 at an end of the add-on component 4 reaches the gap 26 and abuts the mechanical stops 28. The combination of clip 30 and mechanical stops 28 therefore acts as a latching arrangement 32. The clip 30 may be referred to as latching clip and the gap 26 as latching recess. For improving the insertion of the add-on module 4 into the insertion region 24, the insertion region 24 has a pair of tapered guiding surfaces 34, which act as a funnel-like guide to align the add-on module 4 to reach the recess 14.

The add-on module 4 comprises a base frame 36, which can be considered a section of the add-on module 4 that connects to the base plate 6 and provides for a mechanical base. The base frame 36 may comprise stiffening elements for increasing the mechanical stability.

Two distanced legs 38 are attached to and extend away from the base frame 36 substantially perpendicular. They are slightly curved, such that their distance somewhat decreases in an outward direction. At the distal end of the legs 38, a bridge part 40 is provided that connects both legs 38. The bridge part 40 is approximately arranged parallel to the base frame 36 and the base plate 6, respectively. It complements the base frame 10 and the legs 38 to constitute a complete add-on module 4 in form of an attachable and detachable bracket. The legs 38 and the bridge part 40 provide a support frame 41 that is arranged on the base frame 36. Depending on requirements the support bracket 2 may have a different shape and different angles between the individual elements.

Both legs comprise stiffening webs 42 on their inner sides to increase the mechanical stability. Primarily, they are arranged at a side of the legs 38, that is arranged at a distance to a base frame 36. In the example shown, the stiffening webs 42 merge in a region directly underneath the bridge part 40.

Further, both legs 38 comprise a diagonal strut 44 at a region adjacent to the base frame 36. They abut an outer face 46 of the base frame 36 or may be connected thereto, e.g. through welding or by simply manufacturing the add-on module 4 as one integral part. The diagonal struts 44 may be arranged at a distance to each other and primarily provide a stiffening function in a direction parallel to a main extension axis 48 of the base frame 36, which is the sliding direction along the recess 14. Depending on the length of the legs 38, the struts 44 may be shaped and dimensioned differently.

The bridge part 40 comprises a holding section 50, which is a section that provides a holding force for the interior component. Exemplarily, the holding section 50 comprises a borehole 52, into which a screw can be inserted or screwed in. However, other fastening means may be inserted into the borehole 52 to provide the holding function.

Figure 2:
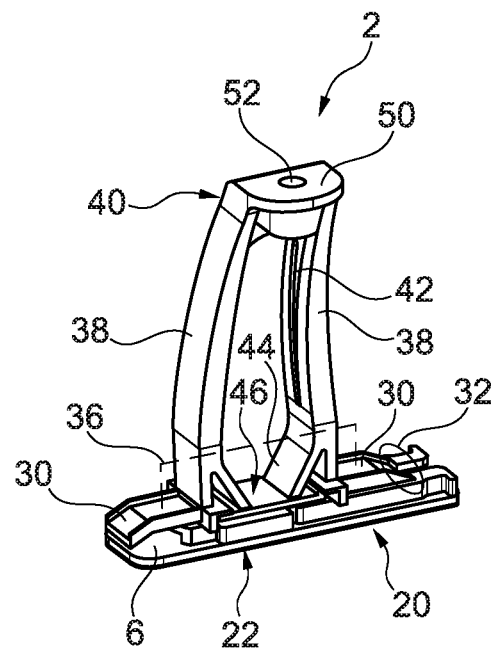

FIG. 2 shows the add-on module 4 inserted into the base plate 6. The length of the base plate 6 is slightly greater than the length of the add-on module 4, such that a first clip 30 ends flush with the base plate 6, while the other clip 30 abuts the mechanical stops 28 in the gap 26. When inserting the add-on module 4 into the insertion region 24, one of the clips 30, that is directed to the insertion region 24, may have to be lifted slightly to allow a sliding of the add-on module 4. When the clip reaches the gap 26, the add-on module 4 may be slid further, until two opposed ramp surface sections 54 are abutted that end in the gap 26. By moving the add-on module 4 further forward, the clip is pushed upwards by the ramp surface sections 54 and reaches an upper surface 56 of the base plate 6. When finally reaching the end position, the particular forward clip 30 moves back into a downward position, as the upper surface 56 terminates in a distance to a forward end 58. Here, a step 60 is created. As stated before, the rearward clip 30 moves down into the gap 26 and abuts the mechanical stops 28. Consequently, the add-on module 4 is latched.

Figure 3:
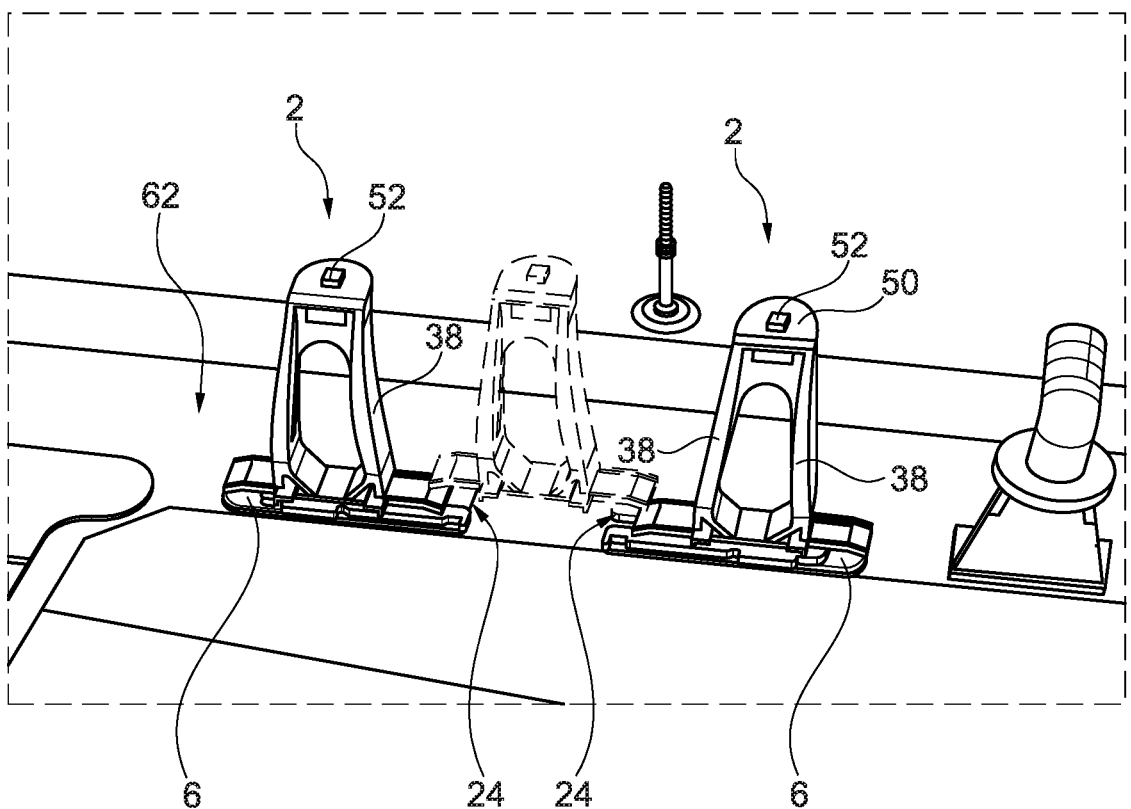

FIG. 3 shows two support brackets 2 arranged on a skin 62 the base plates 6 of the support brackets 2 may be glued or otherwise bonded to the skin 62. It may be advantageous to change the orientation of the base plates 6, such that the insertion regions 24 face to each other.

Figure 4:
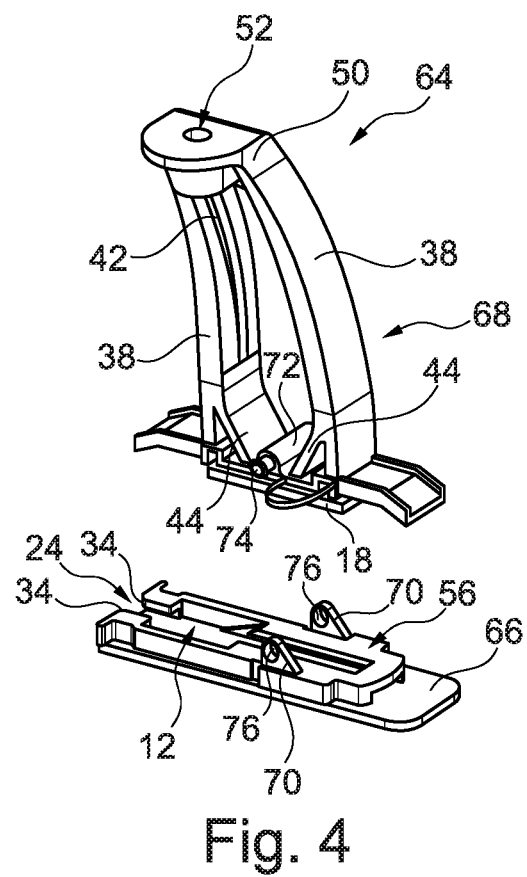
FIGS. 4 and 5 show a modification of the first exemplary embodiment as a second exemplary embodiment.
Figure 5:
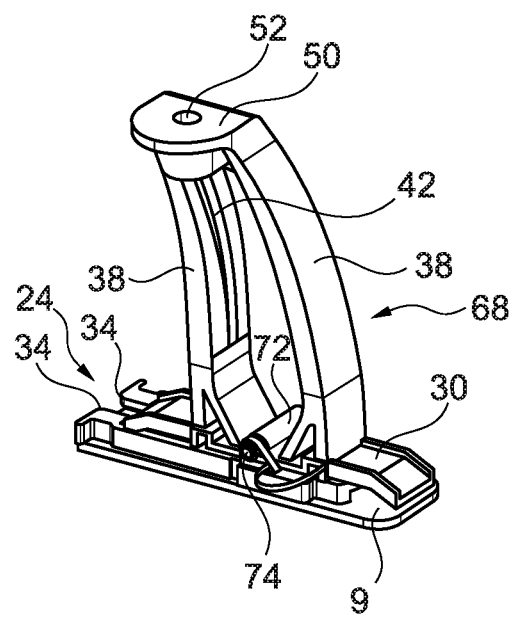

FIGS. 4 and 5 show a support bracket 64 with a base plate 66 and an add-on module 68. The base plate 66 is very similar to the base plate 6 of the previous figures. However, it comprises two additional flanges 70, that are opposed to each other and arranged on the top surface 56. Correspondingly, the add-on module 68 comprises a bushing 72 that is placed between the flanges 70 when the add-on module 68 is attached to the base plate 66. A pin 74 can be inserted into the flanges 70 in openings 76 to reach through the bushing 72. Hence, not only latches the add-on module 68 in the base plate 66, but also is secured by the pin 74.

Figure 6:
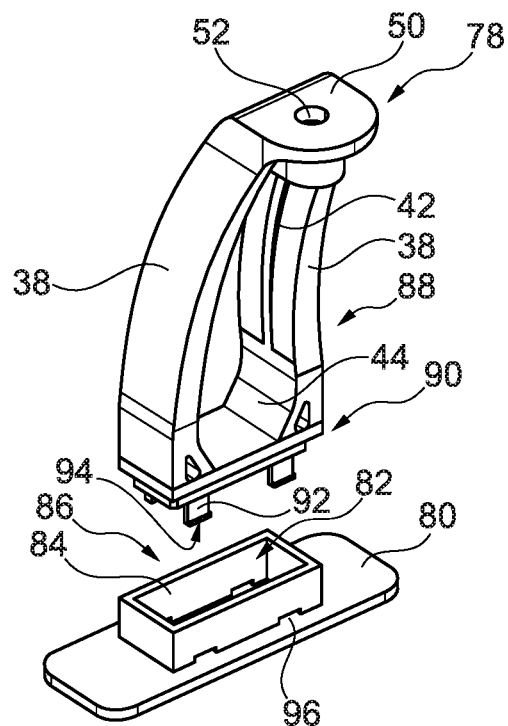
FIGS. 6 and 7 show a third exemplary embodiment.

FIG. 6 shows a support bracket 78, which differs from the previous support brackets. Here, a base plate 80 is shown, having a recess 82 surrounded by webs 84. This constitutes a first engagement device 86. An add-on module 88 comprises a second engagement device 90 with latching clips 92 having hook ends 94 that are designed to correspond with cut-outs 96 in the first engagement device 86. The cut-outs 96 are arranged near a bottom part of the base plate 80 and are arranged in lateral regions. When plugging the add-on module 88 into the recess 82, the latching pins 92 reach the cut-out 96, such that the hooks 94 latch into the cut-out 96.

Figure 7:
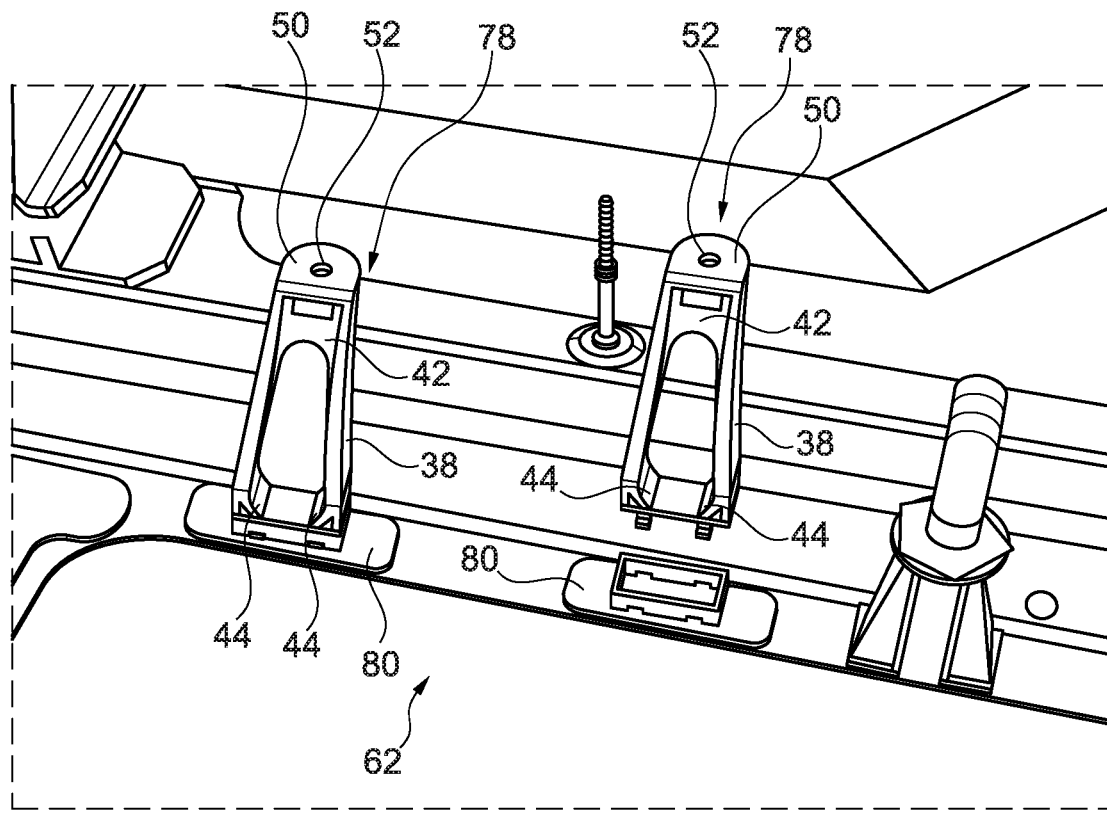

FIG. 7 shows two support brackets 78 in a side by side relationship on the skin 62 of a vehicle.

Figure 8:
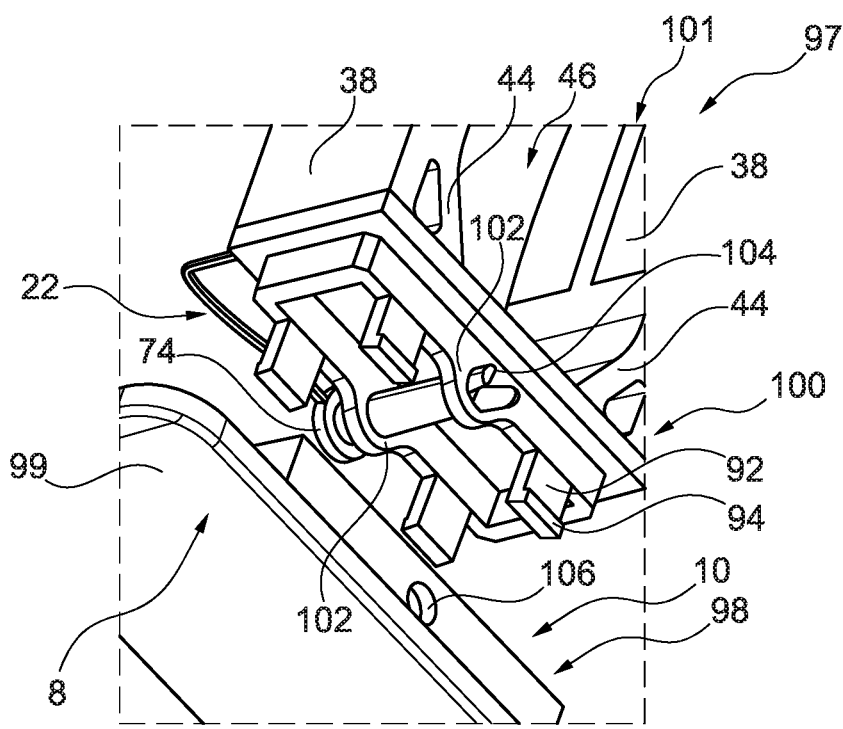
FIGS. 8, 9 and 10 show a fourth exemplary embodiment.
Figure 9:
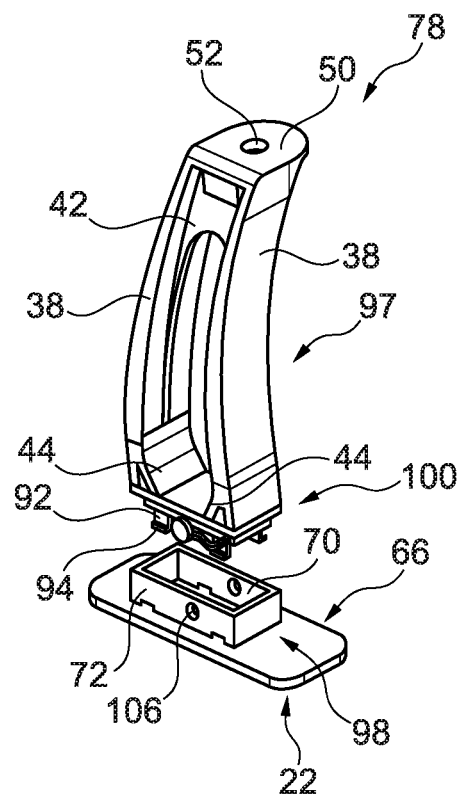
Figure 10:
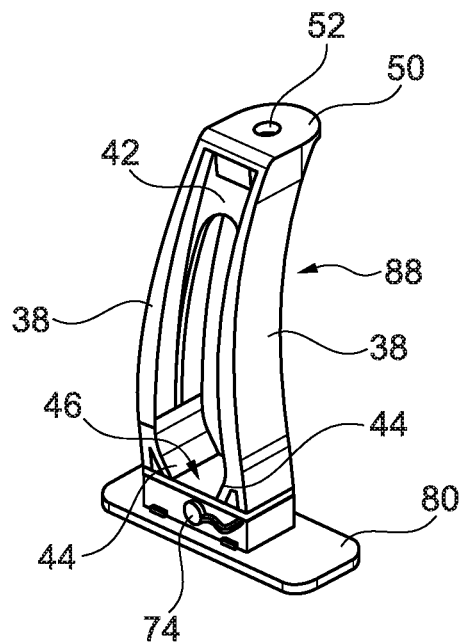

FIG. 8 shows a different design in form of a support bracket 97 having a base plate 99 and an add-on module 101. Here, a first engagement device 98 and a second engagement device 100 are similar to the examples shown in FIGS. 5 and 6, but are modified by a securing pin 74. Two flanges 102 having openings 104 are arranged at the second engagement device 100 and corresponding openings 106 are arranged in the webs 84 of the first engagement device 98 arranged on the base plate 99. An end of the pin 74 can be spread after being inserted into the hole 104. Consequently, the connection between the engagement devices 98 and 100 is locked. This is further demonstrated in FIGS. 9 and 10.

Figure 11:
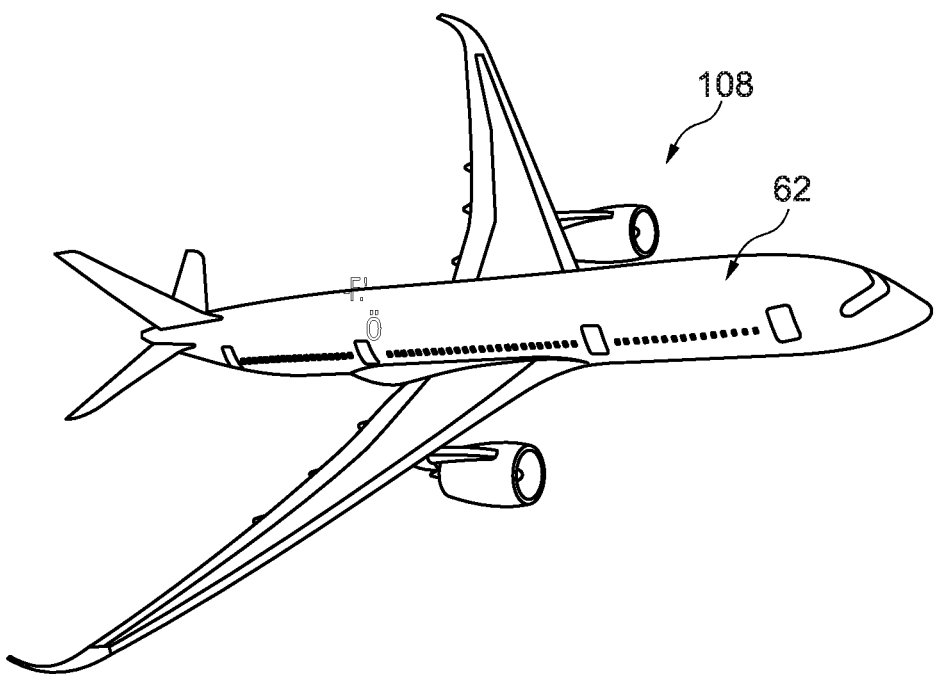
FIG. 11 shows an aircraft having a structure with at least one support bracket arranged on an interior side of the skin.

Finally, FIG. 11 shows an aircraft 108, which may comprise a skin 62, to which a plurality of support brackets 2, 64, 78 or 97 are attached.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A support bracket for holding one or more interior components of a vehicle, the support bracket comprising:
   a base plate comprising:
      a flat attachment face for fixedly bonding the base plate to a vehicle structure; and
      a module face, which is attached to and extends away from the flat engagement face, comprises a first engagement device, and defines an upper surface of the base portion; and
   a separate add-on module comprising:
      a base frame comprising a second engagement device arranged at an engagement face of the add-on module, the engagement face being an opposite side of the base frame from an outer face of the base frame; and
      a holding section for holding the one or more interior components, the holding section being attached to the base frame at the outer face of the base frame;
   wherein the module face is for receiving the add-on module;
   wherein:
      the first engagement device has an elongate recess and the second engagement device has an elongate projection that conforms with the elongate recess; or
      the second engagement device has the elongate recess and the first engagement device has the elongate projection that conforms with the elongate recess; and
   wherein the first engagement device and the second engagement device are configured to conduct a sliding motion parallel to the base plate, from an insertion position to an end position, to reach a form-fit engagement.

2. The support bracket of claim 1, comprising:
   a support frame that is connected on the outer face of the base frame and is positioned extending in an opposite direction from the second engagement device;
   wherein the holding section is on or at a distal end of the support frame.

3. The support bracket of claim 2, wherein the support frame comprises:
   two legs that are attached to the outer face of the base frame, spaced apart from each other by a distance, and extend away from the outer face of the base frame; and
   a bridge part that connects the legs together at an end of the legs that is an opposite end from where the legs are attached to the outer face of the base frame;
   wherein the holding section is formed in the bridge part.

4. The support bracket of claim 1, wherein the first engagement device and the second engagement device are configured to latch into each other when reaching the end position of the sliding motion.

5. The support bracket of claim 1, wherein at least one of the base plate and the add-on module comprises a plastics material.

6. A method for holding one or more interior components of a vehicle, the method comprising:
   providing at least one support bracket of claim 1;
   bonding the flat attachment face of the base plate to the vehicle structure in a material bonding manner;
   inserting the second engagement device into the first engagement device; and
   engaging the first engagement device and the second engagement device.

7. The method according to claim 6, wherein bonding the flat attachment face of the base plate to the vehicle structure comprises an irreversible bonding of the flat attachment face.

8. The method according to claim 6, wherein engaging the first engagement device and the second engagement device comprises moving the second engagement device from an insertion position into an engagement position in the first engagement device.

9. A vehicle comprising:
   a vehicle body having a structure; and
   at least one support bracket of claim 1;
   wherein the base plate of the at least one support bracket is bonded to an interior side of the structure for receiving the add-on module.

10. The vehicle according to claim 9, wherein the structure comprises a skin.

11. The vehicle according to claim 9, wherein:
the structure comprises a fiber reinforced plastics material having a matrix, into which reinforcement fibers are integrated; and
the base plate is integrated into the structure.

12. The support bracket of claim 3, wherein each of the legs comprises a diagonal strut that is connected, at a first end, to one of the legs and, at a second end, abuts the outer face of the base frame.

13. The support bracket of claim 12, wherein the second end of each of the diagonal struts is connected to the outer face of the base frame.

14. The support bracket of claim 13, wherein:
the first engagement device and the second engagement device are configured to latch into each other when reaching the end position of the sliding motion;
the base plate comprises, on opposing sides of the module face in a direction perpendicular to the sliding motion, a flange, each flange comprising an opening formed in the direction perpendicular to the sliding motion;
the add-on module comprises a bushing that is positioned, when the first and second engagement devices are latched into each other, between the flanges and coaxial with the opening formed in each of the flanges; and
a pin is insertable through the opening formed in each flange and through the bushing, such that disengagement of the add-on module from the base plate is resisted prevented by engagement of the pin with the flanges and the bushing.

15. A support bracket for holding one or more interior components of a vehicle, the support bracket comprising:
a base plate;
a first engagement device in a form of a plurality of webs, which are attached to and extend in a vertical direction away from an upper surface of the base plate to define a recess between the plurality of webs, and one or more latching cut-outs formed in one or more of the plurality of webs at an inner end of the recess, against the upper surface of the base plate; and
a separate add-on module comprising:
a second engagement device that is configured for insertion within the first engagement device and, when inserted within the recess of the first engagement device, to latch into the one or more latching cut-outs of the first engagement device, such that a distal end of the second engagement device is against an inner end of the recess; and
a holding section for holding the one or more interior components, the holding section being attached to the second engagement device at a proximal end of the second engagement device, wherein the proximal end of the second engagement device is opposite the distal end of the second engagement device;
wherein the first engagement device and the second engagement device are configured to conduct a form-fit engagement.

16. The support bracket of claim 15, wherein:
the one or more latching cut-outs comprise a plurality of latching cut-outs, each of which is formed in a respective web of the plurality of webs; and
the second engagement device comprises a plurality of latching clips, wherein each of the plurality of latching clips is, when the second engagement device is inserted within the first engagement device, axially aligned with and configured for latching into a corresponding one of the plurality of latching cut-outs to firmly connect the add-on module to the base plate.

17. The support bracket of claim 15, wherein the plurality of webs extend perpendicularly away from the upper surface of the base plate.

18. The support bracket of claim 15, comprising:
a support frame that is connected on the outer face of the base frame and is positioned extending in an opposite direction from the second engagement device;
wherein the holding section is on or at a distal end of the support frame.

19. The support bracket of claim 18, wherein the support frame comprises:
two legs that are attached to the outer face of the base frame, spaced apart from each other by a distance, and extend away from the outer face of the base frame; and
a bridge part that connects the legs together at an end of the legs that is an opposite end from where the legs are attached to the outer face of the base frame;
wherein the holding section is formed in the bridge part.

* * * * *